UNITED STATES PATENT OFFICE 1,934,727

SAFRANINE DYESTUFF INTERMEDIATES AND PROCESS OF PREPARING THE SAME

Walter C. Meuly, Milwaukee, Wis., assignor, by mesne assignments, to E. I. du Pont de Nemours & Company, a corporation of Delaware No Drawing. Original application February 26, 1930, Serial No. 431,637. Divided and this application July 3, 1931. Serial No. 548,703

9 Claims. (Cl. 260—129)

This invention relates to new safranine dyestuff intermediates and to a process of preparing the same. More specifically, this invention relates to intermediates which are readily converted into dyestuffs of the safranine series yielding shades of greenish blue having excellent fastness properties to both light and washing.

As described in my copending application, Serial No. 431,637, filed February 26, 1930, of which this application is a division, it is old to produce blue dyestuffs of the safranine series by oxidizing diphenyl-1,3-naphthylene-diamine-8-sulphonic acid with various para-diamines of the group generally known as Nerol acids. For example, U. S. Patent No. 940,354 describes various dyestuffs of this type among which may be mentioned that prepared by the joint oxidation of said naphthylene-diamine and para-amino-ortho'-methoxy-amino-diphenyl-amine-sulphonic acid. Other para-diamine sulphonic acids are also described in said patent. The colors resulting from the use of these dyes are blue or reddish blue.

As described in my copending application referred to, I have found that by substituting for the para-diamine-sulphonic acids mentioned in U. S. Patent 940,354, the following, namely: 4-amino-2'-methoxy-5'-methyl-diphenylamine sulphonic acid, a dyestuff is produced which dyes in greenish blue shades of excellent fastness to light and to washing. This novel dyestuff is exceptionally valuable for dyeing both wool and silk. Its fastness qualities are materially superior to those of the dyestuff obtained by using, as the para-diamine, para-amino-diphenylamine-ortho-sulfonic acid.

The intermediates which I use in the production of the novel dyestuffs are in themselves novel products and form the subject matter of this application. These intermediates may be prepared by condensing cresidine with para-nitro-chloro-benzene-ortho-sulfonic acid in the presence of an alkaline reacting substance and reducing the resulting condensation product to its corresponding amine.

It is accordingly, an object of this invention to provide new intermediates for use in preparing a dyestuff of the safranine series which is extremely fast to light and washing.

It is a further object of this invention to prepare novel dyestuff intermediates by condensing cresidine with para-nitro-chloro-benzene-ortho-sulfonic acid and reducing the condensation product to the corresponding amine.

Other and further important objects of this invention will become apparent from the following description and appended claims.

The following examples in which parts by weight are given serve to illustrate the methods of preparing the novel dyestuff intermediates according to my invention.

Example 1

137 parts of cresidine (meta-amino-para-cresol methyl ether) and the sodium salt of 286 parts of para-nitro-chloro-benzene sulphonic acid are charged into an autoclave with 1200 parts of water. 109 parts of sodium bicarbonate are then added. The autoclave is closed and the mass therein heated to about 180° C. This temperature is maintained for a period of about 12 hours or until the conversion is complete. The condensation mass is then cooled to below 100° C. and acidified with 20° Bé. hydrochloric acid until it reacts acid to Congo red paper. After cooling the reaction mass to room temperature, the end product may be isolated in the form of an orange yellow crystalline mass having a constitution probably corresponding to the following formula:

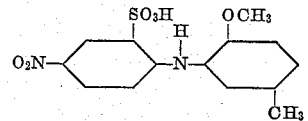

If desired, this product which is 4-nitro-2'-methoxy-5'-methyl-diphenylamine sulfonic acid, may be reduced directly to the amine in the well-known manner.

Example 2

The reduction of the above condensation mass may be carried out as follows:

The acidified condensation mass is run into a mixture of 300 parts of iron powder, 600 parts of water and 28 parts of 20° Bé. hydrochloric acid. The mixture is maintained at a temperature of 90 to 95° C. When the reduction is complete, as shown by a test sample, the iron is precipitated by the use of about 32 parts of soda ash and removed by filtration. Common salt is then added to the filtrate and the filtrate cooled, whereupon the product precipitates rather completely in the form of its sodium salt. This salt is filtered off and dried. It constitutes a grayish-white crystalline powder which can be transformed into its free acid by acidification in solution. In the form of its free acid, it probably is 4-amino-2'-methoxy-5'-methyl-diphenyl-amine sulfonic acid and, most likely, possesses the following chemical constitution:

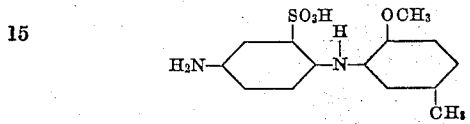

It is, of course, to be understood, that while I have disclosed the preferred embodiment of my invention, various details of my disclosure may be varied and, accordingly, I do not propose to limit my invention except as necessitated by the prior art.

It should also be understood that the utility of my novel products is general and is not limited to the preparation of safranine dyestuffs. For example, the new products may be used in the synthesis of azo type dyestuffs.

I claim as my invention:

1. A compound having most probably the following chemical constitution:

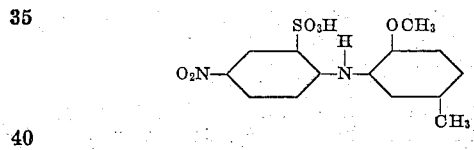

2. A dyestuff intermediate having in the form of its free acid most probably the following chemical constitution:

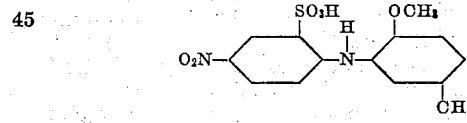

said intermediate being obtainable by condensing cresidine with para-nitro-chloro-benzene-ortho-sulphonic acid in the presence of an alkaline reacting agent.

3. A compound having in the form of its free acid most probably the following chemical constitution:

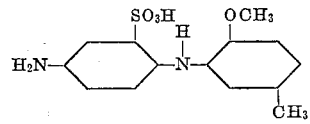

said compound being obtainable by condensing cresidine with para-nitro-chloro-benzene-ortho-sulphonic acid in the presence if an alkaline reacting substance and reducing the resulting condensation product to its corresponding amine.

4. The process of preparing a dyestuff intermediate which comprises condensing cresidine with para-nitro-chloro-benzene-ortho-sulphonic acid in the presence of an alkaline reacting substance.

5. The process of preparing a dyestuff intermediate which comprises condensing cresidine with para-nitro-chloro-benzene-ortho-sulphonic acid in the presence of an alkaline reacting substance under pressure and at a temperature of approximately 180° C.

6. The process of preparing a dyestuff intermediate which comprises condensing cresidine with para-nitro-chloro-benzene-ortho-sulphonic acid in the presence of an alkaline reacting substance and reducing the resulting condensation product to its corresponding amine.

7. The process of preparing a dyestuff intermediate which comprises condensing cresidine with para-nitro-chloro-benzene-ortho-sulphonic acid in the presence of sodium bicarbonate and treating the resulting condensation product with a mixture of iron powder and hydrochloric acid to reduce the same to its correspinding amine.

8. The process of preparing a dyestuff intermediate which comprises heating 4-nitro-2'-methoxy-5'-methyl-diphenylamine sulfonic acid with powdered iron and hydrochloric acid to thereby reduce said nitro body to its corresponding amine.

9. Compounds having most probably the following chemical constitution:

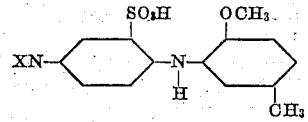

in which X stands for two atoms of hydrogen or oxygen.

WALTER C. MEULY.